Dec. 11, 1956  F. K. HÜBNER  2,773,654

SPINNING TYPE FISHING REEL

Filed Sept. 20, 1955  2 Sheets-Sheet 1

INVENTOR
FRANZ K. HUBNER
BY Wenderoth, Lind + Ponack
Attys.

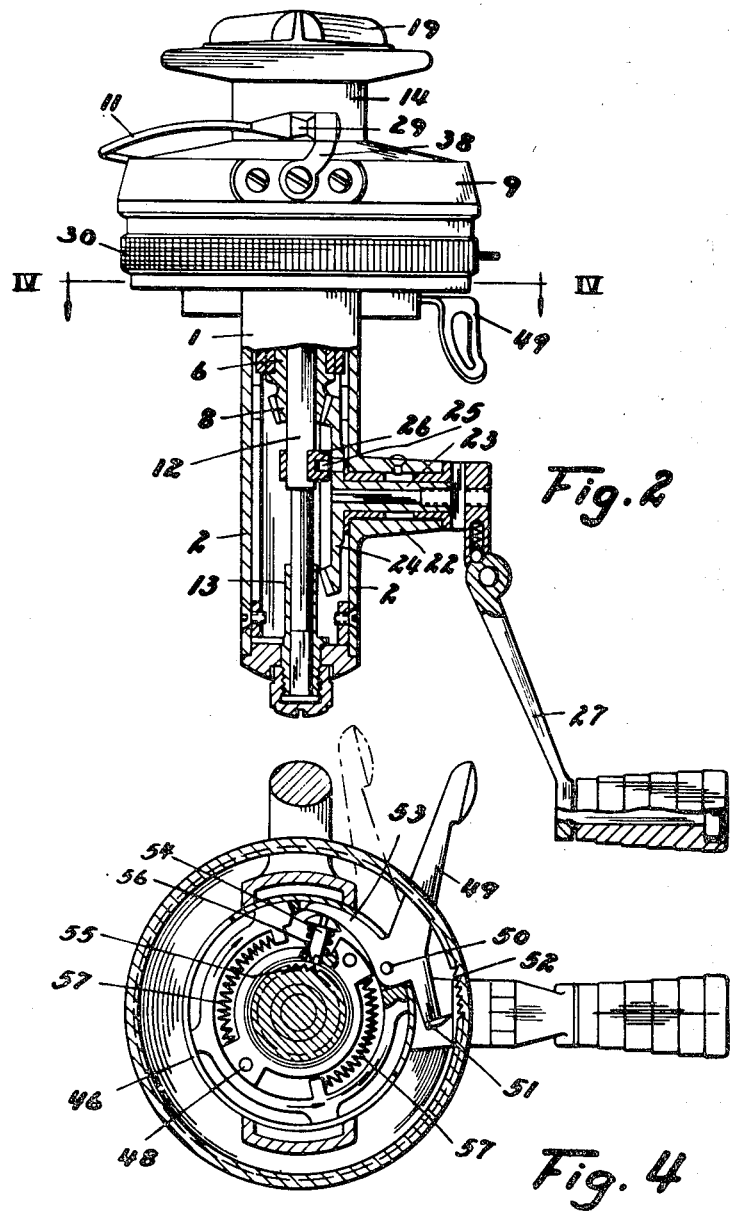

United States Patent Office 2,773,654
Patented Dec. 11, 1956

2,773,654

SPINNING TYPE FISHING REEL

Franz Karl Hübner, Malmö, Sweden, assignor to Victory Produkter Aktiebolag, Malmö, Sweden, a corporation of Sweden Application September 20, 1955, Serial No. 535,325

Claims priority, application Sweden September 21, 1954

8 Claims. (Cl. 242—84.4)

This invention relates to a non-rotatable spool type of reel, particularly for fishing.

The prior art fishing reels of the type herein referred to comprise a frame, a head mounted for rotation on said frame, line pick-up means supported on said head at diametrically opposed points thereof and rockable through 180° between a closed and an open position, an axially reciprocating spool coaxial with said head, and a crank drive to impart the respective movements to both the head and the spool simultaneously, a latch which can be released by rotation of the head being adapted to hold said line pick-up means in the open position against the action of a return spring force.

The fishing reel according to the invention is also of the aforesaid kind, but in addition thereto it is characterized by the feature that the head is provided with an outer ring rotatable in relation to said head and coupled to a gearing by means of a pivot for said line pick-up means, and that a trip lever is adapted, when acted upon by a finger, to rotate said ring in such a direction that said line pick-up means is moved from closed to open position.

Further and more specific objects of the invention will become apparent from the following description, reference being had to the accompanying drawings illustrating a fishing reel in accordance with the invention. In the drawings:

Fig. 2 is a side elevation of the fishing reel as seen from the left in Fig. 1, certain parts being shown in section.

Fig. 4 is a section on line IV—IV in Fig. 2.

Figure 1:
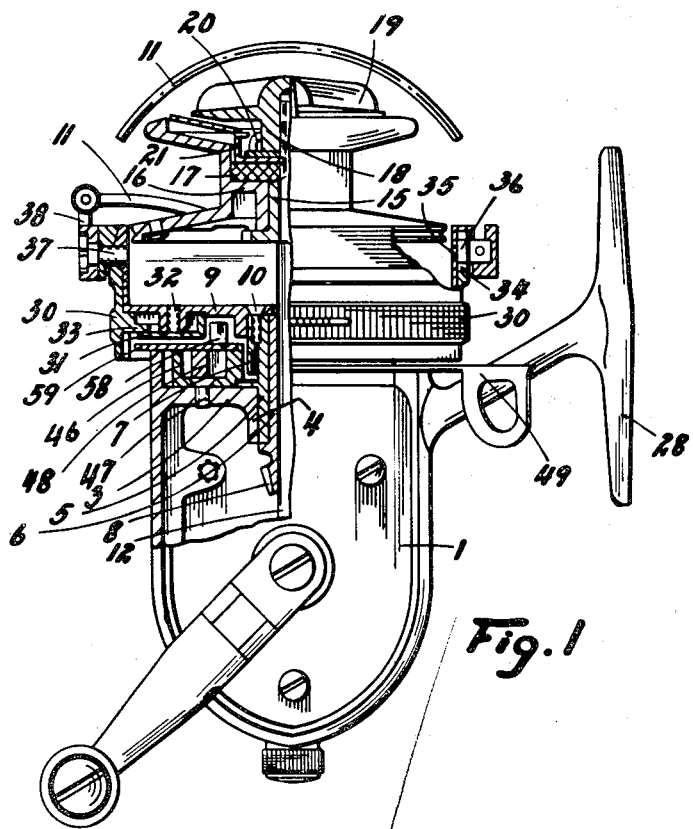
Fig. 1 is a side elevation of the fishing reel, certain parts being cut to show the inner design thereof.

The illustrated fishing reel comprises a frame 1 in the form of a housing having two opposed, plane, vertical side covers 2 and a horizontal top piece 3. In said top piece there is formed a fixed vertical bearing sleeve 4 in which a fixed bearing bushing 5 is disposed. A tubular shaft 6 is rotatable in said bushing, and around the upper end of said shaft there is mounted a cylindrical ring 7 which is rigidly connected to the shaft and the lower part of which has a bore of greater diameter than that of the upper part in order freely to enclose the upper end of the bearing bushing 5 and form an internal shoulder by means of which said ring 7 and said shaft 6 are supported on the upper end edge of the bushing. The lower end of shaft 6 projects downwards into the interior of the housing 1 and is formed into a bevel gear 8 for rotation of said shaft, as will be described hereinafter.

A cup-shaped head 9 of circular cross section is secured to the upper end of shaft 6 and ring 7 above the housing 1 by means of screws 10 so that said head can be rotated by means of the shaft. A semi-circular line pick-up means 11 is arranged on the head 9 by having its ends connected to pivots mounted in alignment at diametrically opposed points, said pivots permitting the line pick-up means to rock through 180°, as will be described more in detail hereinafter.

An axially movable spindle 12 extends through the tubular shaft 6, and the lower end portion thereof is movably guided in a bush 13 inserted in the bottom of the housing 1. The spindle 12 projects upwardly into the cup-shaped head 9, and a spool 14 is mounted on the upper end portion of said spindle 12. The spool 14 has an internal bush 15 secured thereto by means of screws and resting on a shoulder on the spindle 12. A frictional clutch is arranged in the spool 14 and comprises an annular flange 16 formed on the inner side of the spool, a frictional ring 17 e. g. of felt resting on said flange, and a ring 18 non-rotatably but axially movably disposed on the spindle 12. A wing nut 19 is screwed on the extreme end of the spindle for compressing said parts of the frictional clutch. The compression is effected over an arresting device constituted by a spring 20 secured to the wing nut and a number of holes or recesses in ring 18, in which the end of the spring tends to enter in order that at a given, sufficiently strong pull on the line wound onto the spool 14 the latter may be able to rotate on the spindle. Like ring 18, a cup-shaped ring 21 is non-rotatably but axially movably disposed on the spindle 12 between rings 17 and 18 and projects with its outer rim upwards between the spool 14 and the wing nut 19. The rim of ring 21 is provided with a graduation to indicate the position of the wing nut and consequently the degree of compression of the clutch.

One side cover 2 of the housing 1 is formed with a projecting bearing sleeve 22 in which a shaft 23 is rotatable. At its inner end said shaft 23 carries a bevel gear 24 which is in mesh with the bevel gear 8 on shaft 6. The gear 24 has an eccentrically mounted, axially inwardly projecting pin 25 which engages in a transverse groove provided in a block 26 secured to the spindle 12 so that when the gear 24 rotates, said pin produces an up and down movement of the spindle 12 and the spool 14 thereon at the same time as the head 9 is rotated by the bevel gearing 8, 24. Secured to the outer end of shaft 23 is a crank 27 for driving the described mechanism for operating the head 9 and spool 14.

To the extent hitherto described the fishing reel is broadly identical with prior art fishing reels which are composed of the same main parts, though partly of other design. It may be suitable briefly to mention here how such a fishing reel is used in spinning. It is assumed that the fishing reel is secured to a fishing rod by means of a holder 28 and that the line passed through the guide rings on the rod is wound onto the spool ready for a throw. The line pick-up means 11 is to occupy open position which is that opposed to the closed or working position shown in Fig. 2, and said means is therefore moved by hand to this open position where it is retained by means of some suitable latch. Due to the weight of the artificial bait attached to the line said line tends to unwind itself from the spool 14, and to prevent this the line has to be retained by the fingers of the hand holding the rod and be released only when the throw is made. When the line is then wound up by means of the crank 27, the head 9 is rotated, whereby the line pick-up means 11 is released and swung to the closed position shown in Fig. 2, picking up the line and moving it towards one end of the line pick-up means where a pulley 29 is disposed, over which the line passes during the continued reeling in that during the rotation of the head the line pick-up means winds the line about the spool 14, while the latter is driven to and fro. Should a fish have bitten so that a strong pull is exerted on the line, the spool proper, when the pull has reached a certain limit and while the reeling is continued, may start rotating while overcoming the resistance of the frictional clutch 16—18.

In accordance with the invention the rotatable head 9 is provided with a ring 30 which surrounds the lower portion of the head 9 and also extends some distance below it. A retaining ring 31 is fixed by means of screws 32 at a distance from the bottom of the head and forms a support for an internal peripheral flange 33 on the ring 30 to retain the latter in its position about the head while allowing rotation thereof in relation to the head. The ring 30 has a toothed segment 34 on part of its upper peripheral edge. One pivot 35 of the line pick-up means 11 is radially mounted in the peripheral wall of the head 9 above the ring 30, and outside said ring it carries a gear which is in mesh with the toothed segment 34. Rotation of the ring 30 around the head 9 will therefore result in a rotation of the pivot and a rocking of the line pick-up means 11 in one or the other direction. An arm 38 is secured to the other pivot 37 of the line pick-up means 11, which pivot is mounted diametrically opposite the pivot 35 in the peripheral wall of the head 9. The end of the line pick-up means carrying the pulley 29 is secured to said arm 38 eccentrically in relation to the pivot, as will appear from Fig. 2.

Figure 3:
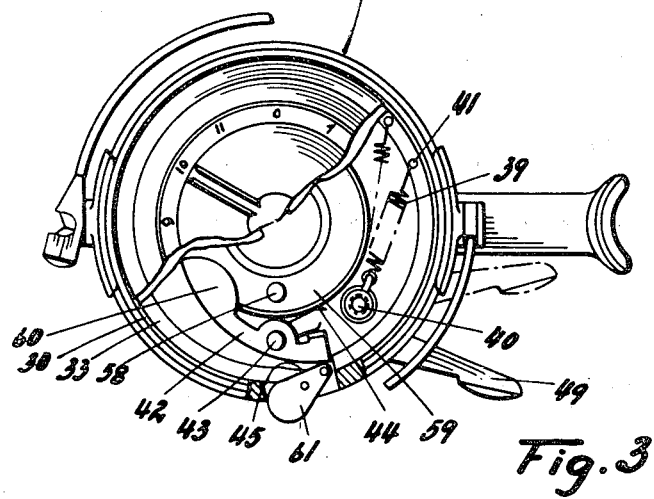
Fig. 3 is a plan view of the fishing reel, certain parts being broken away.

Normally, the ring 30 is held by two coiled springs 39 in that position in relation to the head 9 which corresponds to the "closed" or working position of the line pick-up means (see Fig. 2). Each of said two coiled springs 39 is interposed between one of two pins 40 diametrically mounted at the underside of the head 9, and one of two studs 41 secured to the flange 33 of the ring 30 (but one spring and the pertaining pin and stud are visible in Fig. 3). On rotation of the ring 30 from said position, which can be performed by hand but is preferably carried out in practice by means of a device described hereinafter, the line pick-up means 11 rocks through 180° into the opposite open position in which a pawl 42 which is swingably mounted on a pin 43 at the underside of the head 9 and is urged against the inner peripheral edge of the flange 33 on ring 30 by a spring 44, retains the line pick-up means 11 against the action of springs 39 by falling into a notch 45 in said flange and preventing the coiled springs 39 from turning the ring 30 back.

On the upper side of the top piece 3 of the housing 1, there is secured a ring 46 by means of screws 47. Said ring is coaxial with the spindle 12 and has an annular recess or groove on the upper side, in which another ring 48 is rotatable. A trip lever 49 is swingably mounted about a pivot 50 in the latter ring 48. This lever 49 extends through a slot in the ring 46 in order to be operated by a finger on the hand holding the fishing rod. The lever 49 is formed on one hand with a latch and feed member 51 which can be caused to engage a row of teeth 52 on the inside of the lower portion of the ring 30 on the head 9, and on the other hand with a pressure arm 53 which extends peripherally in a recess in ring 48 and bears against a catch 54 which extends radially through ring 46 and may engage with its edge-shaped end in a serration 55 provided on the periphery of the ring 7 connected to the shaft 6 in order that said shaft and thus head 9 may be held against rotation when, by a pressure on lever 49, said catch 54 is depressed against the action of a coiled spring 56 surrounding said catch. The member 51 and pressure arm 53 are so arranged that the former will engage the row of teeth 52 at the same time as the catch 54 engages the serration 55. At a continued pressure on lever 49 said lever takes the ring 48 along in a rotary movement about its centre axis, the pressure arm 53 sliding over the catch 54 and the member 51 carrying the ring 30 along so that the latter rotates in relation to the head 9 which is held locked by the catch 54 and produces the above shifting of the line pick-up means 11 from closed to open position. Said rotation of ring 48 is carried out against the force of two coiled springs 57 disposed in the groove in ring 46 between a pair of fixed abutments thereon and two abutments on ring 48. When the lever 49 is released, the ring 48 will therefore be moved back into normal position, and furthermore the force of spring 56 causes the catch 54 to release head 9 and the lever 49 to return into normal position. Although member 51 is thereby disengaged from the row of teeth 52, the ring 30 will remain non-rotatable in relation to head 9 because it is now locked by pawl 42, i. e. the line pick-up means 11 remains in open position. In this condition of the fishing reel the line may run out freely over the upper peripheral edge of the spool 14 without being prevented by the line pick-up means 11.

To produce an automatic release of the pawl 42 as soon as the movable mechanism of the fishing reel is started by means of crank 27, a pin 58 is disposed on the upper side of a fixed, plane cover ring 59 mounted over the fixed ring 46, and said pin 58 projects inside the retaining ring 31 into the path of a rounded cam 60 on the pawl 42. At the rotation of the head 9 the cam 60 will therefore meet the pin 58 and release the pawl. As a result, the ring 30 is returned by springs 39, shifting the line pick-up means 11 to closed position in which during the continued rotation of head 9 said means winds the line onto the spool 14 while the latter moves axially to and fro.

It is suitable to provide means for releasing the pawl 42 also by hand without a rotation of head 9. Said means may consist of a lever 61 which is swingably mounted in a recess in ring 30, its inner end carrying an axial pin adapted to bear against the pawl 42 and its outer end projecting outside the ring 30 to permit swinging of the lever by finger pressure so that said pin urges the pawl 42 inwardly out of engagement with notch 45. Said lever also has the effect that after it has been swung in the above manner and if it is not returned to normal position, it prevents a new locking of ring 30. If the lever 49 is now operated, the line pick-up means 11 certainly shifts over to open position but it does not remain there, when the lever is released.

The described fishing reel functions as follows. It is assumed that the line is wound onto the spool 14 and that the line pick-up means 11 is in working position. The line pick-up means is first moved over into open position by hand, in which it is retained by pawl 42 engaging with notch 45 in ring 30, and the line is then passed through the guide rings on the fishing rod. After that, it is possible to release the line pick-up means 11 by rotating the crank 27, the head 9 and ring 30 rotating and cam 60 on pawl 42 meeting pin 58 so that ring 30 is released and returned by springs 39. The release of the line pick-up means 11 may also take place without a rotation of the head 9 by reversing the lever 61. The fishing reel is now ready for a throw. The line pick-up means 11 retains the line so that it does not run out prematurely by reason of the weight of the artificial bait. Thus, it is not necessary to retain the line with the fingers. At the throw one finger depresses the lever 49 whereby a locking of head 9 is produced and the line pick-up means 11 is again shifted to open position. After the throw the line may be reeled in by means of the crank 27, the line pick-up means 11 shifting automatically over into closed position at the beginning of the reeling, as is the case in prior art fishing reels. When a fish has been lifted out of the water and one wants to catch it with the hand, one has to let go of crank 27. To prevent the fish from falling back into the water by rotating the movable parts of the reel backwards, the head 9 can be locked by depressing lever 49 half-way. In other respects the mode of operation of the fishing reel according to the invention is the same as in customary fishing reels.

What I claim and desire to secure by Letters Patent is:

1. A reel comprising a frame, a head rotatably mounted on said frame, line pick-up means supported by said head and rockable through substantially 180° between closed and open positions, an axially reciprocating spool coaxial with said head, ring means surrounding said head and rotatable in relation thereto, gearing means connecting said ring means with said pick-up means, manual means for rotating said ring in a direction to shift said pick-up means from closed to open position through said gearing means, means for holding said pick-up means in the open position against a resetting force, said holding means being releasable by the rotation of the head, and means for imparting rotation to said head and reciprocating movement to said spool simultaneously.

2. A reel as claimed in claim 1 having the further characteristic that said manual means for rotating said ring is adapted, when acted upon, first to lock the head to the frame and then to rotate the ring in relation to the head.

3. A reel comprising a frame, a head rotatably mounted on said frame, line pick-up means supported by said head and rockable through substantially 180° between closed and open positions, an axially reciprocating spool coaxial with said head, ring means surrounding said head and rotatable in relation thereto, gearing means connecting said ring means with said pick-up means, a member mounted on top of said frame for angular movement about the axis of said head, spring means for holding said member in a predetermined normal position, manual lever means pivotally mounted on said member and adapted, when acted upon, first to move about its own pivot axis to lock said head to said frame and then to move together with said member about the axis of said head while engaging said ring to rotate the latter in a direction to shift said pick-up means from closed to open position through said gearing means, means for holding said pick-up means in the open position against a resetting force, said holding means being releasable by the rotation of said head, and means imparting rotation to said head and reciprocating movement to said spool simultaneously.

4. A reel comprising a frame, a head rotatably mounted on said frame, line pick-up means supported by said head and rockable through substantially 180° between closed and open positions, an axially reciprocating spool coaxial with said head, ring means surrounding said head and rotatable in relation thereto, gearing means connecting said ring means with said pick-up means, a member mounted on top of said frame for angular movement about the axis of said head, spring means for holding said member in a predetermined normal position, manual lever means pivotally mounted on said member, means actuated by said manual lever means at an initial movement of the latter about its own pivot axis for locking said head to said frame, means for positively engaging said lever means with said ring as a result of said initial movement to enable said lever means by a subsequent movement thereof together with said member about the axis of said head to rotate said ring in a direction to shift said pick-up means from closed to open position through said gearing means, means for holding said pick-up means in the open position against a resetting force, said holding means being releasable by the rotation of said head, and means imparting rotation to said head and reciprocating movement to said spool simultaneously.

5. A reel comprising a frame, a head rotatably mounted on said frame, line pick-up means supported by said head and rockable through substantially 180° between closed and open positions, an axially reciprocating spool coaxial with said head, ring means surrounding said head and rotatable in relation thereto, gearing means connecting said ring means with said pick-up means, a member mounted on top of said frame for angular movement about the axis of said head, spring means for holding said member in a predetermined normal position, manual lever means pivotally mounted on said member, a serrated annular boss integral with said head and depending centrally from the bottom thereof, catch means movable radially in said frame for engagement with said serrated annular boss, means on said manual lever means for actuating said catch means at an initial movement of said lever means about its own pivot axis to move said catch means inwardly into engagement with said serrated annular boss against the action of a withdrawing force for locking said head to said frame, means for positively engaging said lever means with said ring as a result of said initial movement to enable said lever means by a subsequent movement thereof together with said member about the axis of said head to rotate said ring in a direction to shift said pick-up means from closed to open position through said gearing means, means for holding said pick-up means in the open position against a resetting force, said holding means being releasable by the rotation of said head, and means imparting rotation to said head and reciprocating movement to said spool simultaneously.

6. A reel comprising a frame, a head rotatably mounted on said frame, line pick-up means supported by said head and rockable through substantially 180° between closed and open positions, an axially reciprocating spool coaxial with said head, ring means surrounding said head and rotatable in relation thereto, gearing means connecting said ring means with said pick-up means, a member mounted on top of said frame for angular movement about the axis of said head, spring means for holding said member in a predetermined normal position, manual lever means pivotally mounted on said member, means actuated by said manual lever means at an initial movement of the latter about its own pivot axis for locking said head to said frame, a row of teeth formed on said ring means, pawl means on said manual lever means for engaging in said row of teeth as a result of said initial movement to enable said lever means by a subsequent movement thereof together with said member about the axis of said head to rotate said ring in a direction to shift said pick-up means from closed to open position through said gearing means, means for holding said pick-up means in the open position against a resetting force, said holding means being releasable by the rotation of said head, and means imparting rotation to said head and reciprocating movement to said spool simultaneously.

7. A reel comprising a frame, a head rotatably mounted on said frame, line pick-up means supported by said head and rockable through substantially 180° between closed and open positions, an axially reciprocating spool coaxial with said head, ring means surrounding said head and rotatable in relation thereto, gearing means connecting said ring means with said pick-up means, manual means for rotating said ring in a direction to shift said pick-up means from closed to open position through said gearing means, pawl means pivotally mounted on the bottom of said head, an internal notch in said ring means for engagement of said pawl means in an angular position of said ring means corresponding to the open position of said pick-up means to hold the latter in said open position against a restting force, means on said frame for releasing said pawl means from said notch by engagement therewith at the rotation of the head, and means for imparting rotation to said head and reciprocating movement to said spool simultaneously.

8. A reel comprising a frame, a head rotatably mounted on said frame, line pick-up means supported by said head and rockable through substantially 180° between closed and open positions, an axially reciprocating spool coaxial with said head, ring means surrounding said head and rotatable in relation thereto, gearing means connecting said ring means with said pick-up means, manual means for rotating said ring in a direction to shift said pick-up means from closed to open position through said gearing means, pawl means pivotally mounted on the bottom of said head, an internal notch in said ring means for engagement of said pawl means in an angular position of said ring means corresponding to the open position of said pick-up means to hold the latter in said open position against a resting force, means on said frame for releasing said pawl means from said notch by engagement therewith at the rotation of the head, lever means mounted on said ring means for releasing said pawl means from said notch by engagement therewith optionally through manual operation, and means for imparting rotation to said head and reciprocating movement to said spool simultaneously.

No references cited.